United States Patent [19]

Magori

[11] 4,409,847
[45] Oct. 18, 1983

[54] ULTRASONIC MEASURING ARRANGEMENT FOR DIFFERENTIAL FLOW MEASUREMENT, PARTICULARLY FOR MEASUREMENT OF FUEL CONSUMPTION IN MOTOR VEHICLES WITH A FUEL RETURN LINE

[75] Inventor: Valentin Magori, Munich, Fed. Rep. of Germany

[73] Assignee: Siemens Aktiengesellschaft, Berlin & Munich, Fed. Rep. of Germany

[21] Appl. No.: 292,504

[22] Filed: Aug. 13, 1981

[30] Foreign Application Priority Data

Sep. 26, 1980 [DE] Fed. Rep. of Germany ....... 3036457

[51] Int. Cl.³ .............................................. G01F 1/66
[52] U.S. Cl. .................................. 73/861.28; 73/113; 73/196
[58] Field of Search ..................... 73/113, 196, 861.18, 73/861.27–861.29, 861.31

[56] References Cited

U.S. PATENT DOCUMENTS 4,011,753  3/1977  Hausler ............................ 73/861.28
4,079,623  3/1978  Erwin, Jr. ............................. 73/113
4,351,189  9/1982  Gray et al. ............................ 73/196

FOREIGN PATENT DOCUMENTS 1951378  4/1971  Fed. Rep. of Germany ........ 73/196
2325830  12/1974  Fed. Rep. of Germany ... 73/861.31
121572  3/1958  U.S.S.R. ............................ 73/861.31
445837  6/1975  U.S.S.R. ............................ 73/861.28

Primary Examiner—Charles A. Ruehl
Attorney, Agent, or Firm—Hill, Van Santen, Steadman & Simpson

[57] ABSTRACT

A device for measuring a differential flow rate between a foward flow to a user station and a return flow from the user station, particularly well-suited for measuring fuel consumption in motor vehicles with a fuel return line extending between the carburetor or the injection pump and the fuel tank, includes a flow measuring chamber having an ultrasonic measuring arrangement. The flow measuring chamber is comprised of a forward flow tube portion and a return flow tube portion interconnected with one another along an ultrasonic wave path. Within the ultrasonic wave path, there is contained a partitioned wall means, permeable to ultrasonics, which serves to prevent flow communication between the two tube portions. First and second ultrasonic transducers are positioned at opposed ends of the ultrasonic wave path, the first transducer being formed on the forward tube portion and the second transducer being formed on the return tube portion. For measuring the differential flow rate, a first ultrasonic wave proceeds from the first transducer toward the second transducer and a second ultrasonic wave propagates from the second transducer toward the first transducer. The differential flow measurement derives from the difference in wave transit times between the first wave and the second wave.

13 Claims, 5 Drawing Figures

ULTRASONIC MEASURING ARRANGEMENT FOR DIFFERENTIAL FLOW MEASUREMENT, PARTICULARLY FOR MEASUREMENT OF FUEL CONSUMPTION IN MOTOR VEHICLES WITH A FUEL RETURN LINE

BACKGROUND OF THE INVENTION

The present invention relates to a flow measuring chamber assembly using an ultrasonic measuring arrangement for determination of a differential flow rate, such assembly being particularly useful for measuring fuel consumption in motor vehicles having a fuel return line.

There is a need in the operation of motor vehicles to determine the rate of fuel consumption. In order to measure fuel consumption, turbine flow meters are conventionally installed in fuel flow lines, these meters being magnetically or optically sensed to provide fuel flow rate determinations. Ultrasonic processes for monitoring fuel flow rates in order to measure fuel consumption have also been proposed. At the present time, difficulties occur in application of known measuring arrangements for determining fuel consumption in cases where the internal combustion engine for a motor vehicle includes a fuel return line disposed in front of the carburetor. In these cases, the rate of fuel consumption is formed as the difference between the forward flow and return flow of fuel. Typically, two separate flow indicators are installed in the forward flow and return flow lines and an electronic device is used to establish the differential flow measurement, such as discussed in "Neuartiger Turbo-Sensor Misst Benzinverbrach", in Vol. No. 24 "Elektronik" (1979), p. 24. A disadvantage in this conventional arrangement, apart from the relatively high manufacturing costs for the installation of two separate flow indicators, is that errors in measurement occur in both instances of the forward and return flow rates. The acummulative effect of these measurement errors leads to high error factors in the differential flow measurement, particularly when small consumption values occur when the differential flow measurement is the difference of two nearly identical magnitudes.

An object of the present invention is to provide a reliable and low-maintenance measuring arrangement which requires low outlay in terms of cost and space requirements and in which there are no accummulative errors in arriving at a differential flow measurement.

SUMMARY OF THE INVENTION

A flow measuring chamber is provided through which a forward fluid flow passes on a supply path to a user station and a return fluid flow passes from the user station back to a supply source. An illustrative application is in the internal combustion engine for a motor vehicle having a fuel return line running between a metering point, such as the carburetor or fuel injection pump and the fuel tank. The measuring chamber includes an ultrasonic measuring arrangement for differential flow measurement by which a rate of fluid flow consumption at the user station may be determined. An ultrasonic measuring path is disposed in the chamber in such manner that ultrasonic waves successively proceed from a first ultrasonic transducer to a second ultrasonic transducer and vice versa. The ultrasonic waves pass through a tube device wherein identical path lengths occur in a first ultrasonic propagation direction from the first transducer successively through the forward flow and against the return flow and in a second ultrasonic propagation direction from the second transducer successively through the return flow and the forward flow. The chamber device is constructed so that the fluid flows to be measured are separated from one another along the ultrasonic wave propagation paths by a dividing wall which is permeable to ultrasonics. The differential which arises between the first and second ultrasonic transducer output signals serves to define fluid consumption per time unit at the user station. Accordingly, a relatively compact, low-maintenance measuring arrangement is provided having relatively higher measuring precision as compared to known, conventional differential flow measuring arrangements.

DESCRIPTION OF THE PREFERRED EMBODIMENTS

Figure 1:
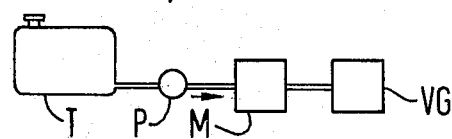
FIG. 1 is a schematic, side elevational view illustrating a known measuring arrangement for fuel consumption in a motor vehicle having a single fuel line flow.
Figure 2:
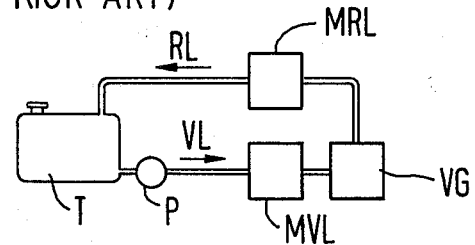
FIG. 2 is a schematic, side elevational view of a known measuring arrangement for fuel consumption in a motor vehicle having forward and return fuel lines.

FIGS. 1 and 2 illustrate typical forms of measuring arrangements for the measurement of fuel consumption in motor vehicles which are already known. FIG. 1 shows a motor vehicle having a single fuel flow line through which fuel is drawn by a fuel pump P from a fuel tank T and passed through a measuring device M, such a turbine flow meter, before being discharged into the engine carburetor VG.

FIG. 2 shows a motor vehicle having forward VL and return RL fuel lines whereby the rate of fuel consumption is determined by the difference in flow rates between the forward and return lines. Fuel is drawn from the fuel tank T by the fuel pump P and passed along the forward fuel line VL through a forward flow measuring device MVL and then into the carburetor VG. Excess fuel is bypassed out of the carburetor VG along the fuel return line RL through a return flow measuring device MRL and then back into the fuel tank.

The present invention concerns an ultrasonic measuring arrangement for differential flow measurements whereby the difference in flow rates between a forward flow and return flow determine the fluid consumption per unit time at a user station. Utilizing known principles for differential flow measurement using an ultrasonic flow meter device, such as discussed in K. W. Bonfig in "Technische Durchflussmessung", Vulkan-Verlag (1977), pp. 131–138, a sonic measuring path is disposed so that ultrasonic waves proceeding from a first ultrasonic transducer to a second ultrasonic transducer and vice versa successively traverse equal length paths through the forward flow and through the return flow. The forward and return flow paths are separated from one another by means of a partition member which is permeable to ultrasonics. The cross-sections of the forward and return flow lines along the sonic measuring path are required to be equal. Accordingly, a different wave transit time is produced during movement along the sonic measuring path from the first transducer to the second transducer and results in the reverse direction insofar as the forward and return flow rates differ.

In measuring a single direction flow, the reciprocal values of the wave transmit times produced by passage of an ultrasonic wave from a first transducer to a second transducer and then vise versa correspond to frequencies, the difference of which two frequencies is proportional to the flow rate of the flowing fluid in a simple ultrasonic flow measurement independent of the sound velocity of the flowing fluid. These frequencies may be referred to as "sing-around" frequencies whereby the flow rate is determined using the "sing-around" ultrasonic measuring method and its variations, such as discussed in the above-mentioned Bonfig article and by H. Muller in "Ultraschall-Durchflussmesser fur das Erfassen auberer und hochverschmutzter Flussigkeiten", "Technisches Messen" (1979), Vol. No. 3, pp. 113–116. These frequencies may also derive as "engagement" frequencies for use in the Lambda-locked-loop ultrasonic measuring method, disclosed in German patent application No. P 28 28 937.4. The following equation is used for the calculation of flow rate:

$$v = K \cdot \Delta f,$$

wherein
  v = flow rate,
  K = apparatus constant (depending upon geometric dimensions and the ultrasonic measuring method being used), and
  Δf = difference in frequencies.

In accordance with the present invention, ultrasonic measuring methods are employed to measure the difference in flow rates between a forward flow line and a return flow line. The differential flow measurement is derived from the difference in transit times for two ultrasonic wave propagations, one representing a forward flow rate and the other representing a return flow rate. Accordingly, the equation used is:

$$V = v_1 - v_2 = K' \cdot \Delta f \left( 1 - \frac{v_1 \cdot v_2}{c^2} \right)$$

wherein
  V = fluid consumption at user station/unit time,
  $V_1$ = forward flow rate,
  $V_2$ = return flow rate
  K' = apparatus constant (depending upon geometric dimensions and the ultrasonic measuring method being used), and
  Δf = difference in frequencies.

This equation means that the difference between the forward flow rate and the return flow rate is proportional to a frequency difference except for a small perturbation term. This small perturbation term occurring in the differential measurement is a fraction of the forward and return flow rates multiplied together over the square of the sound velocity. The following approximation sets forth the maximum error to be expected from the ultrasonic differential measurement:

$$F_{max} = \frac{v_1 \cdot v_2}{c^2} \leq \left( \frac{v_{1max}}{c} \right)^2$$

wherein
  $F_{max}$ = maximum principle-conditioned error and
  $v_{1max}$ = maximum forward flow rate.

In the instance of a differential measurement for determining fuel consumption, the maximum error equation means that, given an assumed forward flow rate of 1 m/sec (approximately 100l/h given a 6 mm rated tube size), a maximum system error of $10^{-6}$ occurs. The small error arising from such a measurement technique means that no additional system error influence need be taken into consideration when using an ultrasonic differential flow measurement technique to measure fuel consumption and that the outlay for transducers and electronic circuits is considerably reduced (nearly by the factor of two) due to the differential flow measurement method.

Figure 3:
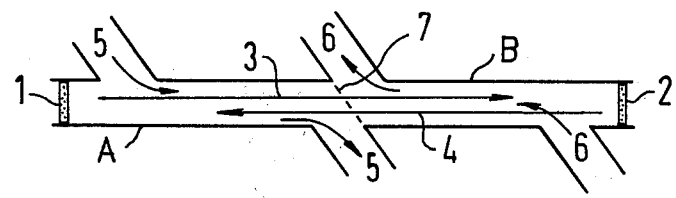
FIG. 3 is a schematic, side elevational view of a flow measuring chamber constructed in accordance with the present invention for measuring fuel consumption by means of a differential flow measurement.

FIG. 3 illustrates a first embodiment of a tube system for a flow measuring chamber assembly constructed in accordance with the present invention for measuring fuel consumption in a motor vehicle having a forward flow line and a return flow line. The tube system comprises two tube portions A and B disposed coaxially longitudinally abutting one another. Each tube portion is formed with flow line pipes leading to and from the tube portion and extending diagonally to and from the tube portion and extending diagonally therefrom, preferably inclined 45° with respect to the tube axis. The respective opposed outer ends of the tube system are closed by a first ultrasonic transducer 1 fitting in the forward tube portion A and a second ultrasonic transducer 2 fitting in the return tube portion B. A diagonal wall 7, which is permeable to ultrasonics, serves a common partition dividing the tube portions. A first ultrasonic wave 3 propagates in the direction indicated by the arrow from the first ultrasonic transducer 1 toward the second ultrasonic transducer 2. A second ultrasonic wave 4 propagates in the opposite direction as indicated by the other arrow from the second ultrasonic transducer 2 toward the first ultrasonic transducer 1. Forward fuel flow 5 passes through the forward tube portion A in route between the intake and discharge pipes connected thereto. Return fuel flow 6 passes through the return tube portion B in route between the intake and discharge pipes connected to that tube portion.

The arrangement shown in FIG. 3 is particularly well-suited for use with small amounts of fluid flow through small diameter pipes at a low flow rate. The difference in transits times between the first ultrasonic wave propagation and the second ultrasonic wave propagation serves to provide for determination of a differential flow measurement, which forms the present rate of fuel consumption by the motor vehicle.

Figure 4:
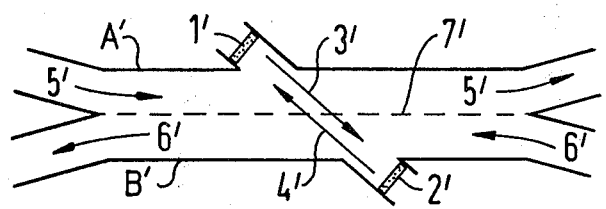
FIG. 4 is a schematic, side elevational view of a further embodiment of the inventive flow measuring chamber arrangement shown in FIG. 3.

FIG. 4 shows a second embodiment of a tube system for a differential flow measuring chamber constructed according to the present invention, in which forward and return tube portions are disposed laterally abutting one another, with parallel longitudinal axes. A forward tube portion A' and a return portion B' are placed side-by-side such that the respective fuel flows therethrough pass substantially parallel to one another. The flow paths through the tube portions are separated by a common dividing wall 7' which is permeable to ultrasonics. The respective opposed ends of the forward and return tube portions A' and B' are formed with corresponding intake and discharge pipes for conducting forward fuel flow 5' and return fuel flow 6' therethrough, respectively. An ultrasonic wave measuring path extends diagonally across the tube system. The wave measuring path is closed at one end by a first ultrasonic transducer 1' formed on the forward tube portion A' fitted in an extension housing preferably inclined 45° to the tube longitudinal axes. The second ultrasonic transducer 2' is formed on the turn tube portion B' and disposed in an extension housing coaxial with and facing the first transducer extension housing, so as to be inclined 45° with respect to the tube longitudinal axes. A first ultrasonic wave 3' propagates in the direction of the indicated arrow from the first transducer 1' to the second transducer 2'. A second ultrasonic wave 4' propagates in the opposite direction from the second transducer 2' toward the first transducer 1'. The first and second ultrasonic waves proceed through forward and return flows 5' and 6' at an inclined angle of, preferably, 45° with respect to the tube longitudinal axes.

The tube system arrangement shown in FIG. 4 is particularly suited for use with large amounts of fluid flow through tubes having large cross-sections. A specific, prescribed minimum cross-section of the tubes is, however, necessary so that the ultrasonic measuring path exhibits the required minimum length. The differential flow measurement derived from the difference in transit times between the first wave propagation 3' and the second wave propagation 4' serves to determine the present rate of fuel consumption for the motor vehicle.

Figure 5:
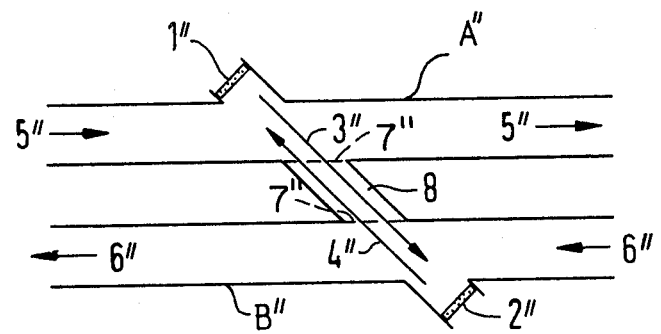
FIG. 5 is a schematic, side elevational view of a third embodiment of the inventive flow measuring chamber arrangement shown in FIG. 3.

FIG. 5 shows a still further embodiment of a tube system for a differential flow measuring chamber constructed in accordance with the present invention, in which a forward tube portion A" and a return tube portion B" are disposed separate and apart from one another but with parallel longitudinal axes. A forward fuel flow 5" passes through the forward tube portion A" in one direction and a return fuel flow 6" passes through the return tube portion B" in the opposite, parallel direction. A tubular coupling body 8 serves connect adjacent facing walls of the two tube portions. The coupling body is sound-conducting and serves to define therethrough an ultrasonic wave measuring path. A partition wall means 7", which is permeable to ultrasonics, closes opposed open ends of the coupling body 8 to prevent fluid flow communication between the forward and return tube portions. The ultrasonic wave path extends diagonally across the tube system and is closed at opposed ends by a first ultrasonic transducer 1" formed on the forward tube portion A" and a second ultrasonic transducer 2" formed on the return tube portion B". The first and second transducers are fitted in extension housings inclined 45° with respect to the tube longitudinal axes and formed on the forward and return tube portions, respectively, such that the first and second transducers face one another. A first ultrasonic wave 3" proceeds from the first transducer 1" toward the second transducer 2"; and a second ultrasonic wave 4" propagates from the second transducer 2" toward the first transducer 1". The differential flow measurement derived from the difference in transit times between the first wave propagation 3" and the second wave propagation 4" serves to determine the present rate of fuel consumption for the motor vehicle.

The partition wall means referred to above can be sheet metal or formed from a plate of non-metallic material. For optimum ultrasonic measuring results, the partition wall means material should have the same acoustical impedance, which is a product of density and sound velocity, as the flowing liquid being measured.

It has been found that the Lambda-locked-loop method for making an ultrasonic flow measurement is particularly advantageous in instances of relatively small flow tube cross-sections and relatively low flow rates: however, it remains within the contemplation of the present invention that other ultrasonic flow measuring techniques may be used in such instances. In addition, it is preferably that the cross-sections of the forward tube portion and return tube portion be equal, at least in the area of the ultrasonic wave path of the measuring arrangement. It may furthermore be advantageous to individually calibrate the respective output signals of the first and second ultrasonic transducers before processing measurements for the determination of a fluid consumption rate.

The flow chamber ultrasonic measuring arrangement of the present invention is not limited to measuring fuel consumption in motor vehicles. It may also be employed for measuring the differential between forward and return flow rates in other cases in which the ratio of maximum flow rate and sound velocity is wellwithin the scope of the measuring precision of the ultrasonic measuring device. For example, a further application arises in the measurement of hot water consumption in buildings. The consumption of industrial fluids at a user station can likewise be conveniently measured in accordance with the present invention.

Although various minor modifications may be suggested by those versed in the art, it should be understood that I wish to embody within the scope of the patent warranted hereon, all such modifications as reasonably and properly come within the scope of my contribution to the art.

I claim as my invention:

1. Apparatus for measuring the differential flow rate between a forward fluid flow to a user station and a return fluid flow from said user station comprising a forward tube means for conducting forward flow therethrough, a return tube means for conducting return flow therethrough, means for providing an ultrasonic wave measuring path between said forward and return tube means including a common partition wall means, permeable to ultrasonics, for preventing flow communication between said forward and return tube means and closed at opposed ends by a first ultrasonic transducer formed on said forward tube means and a second ultrasonic transducer formed on said return tube means, said first ultrasonic transducer transmitting a first ultrasonic wave through said forward flow and said return flow in succession to said second ultrasonic transducer, and said second ultrasonic transducer transmitting a second ultrasonic wave through said return flow and said forward flow in succession to said first ultrasonic transducer, whereby the difference in transit times along said wave measuring path for said first and second ultrasonic waves is used to determine the differential flow rate.

2. The apparatus of claim 1, wherein said flowing fluid is liquid fuel and said apparatus is used to determine fuel consumption for a motor vehicle engine means having a forward fuel line through which fuel is drawn from a fuel tank by a pump means to a fuel metering station and a return fuel line through which fuel is bypassed back to said fuel tank from said fuel metering station.

3. The apparatus of claim 1, wherein said first and second ultrasonic waves traverse an equal length along said wave measuring path.

4. The apparatus of claim 1, wherein said forward tube means and said return tube means are disposed coaxially, longitudinally abutting one another with said partition wall means mounted therebetween, said first transducer mounted at the free end of said forward tube means, said second transducer mounted at the opposed free end of said return tube means, and each of said forward and return tube means are formed with intake and discharge pipe means for conducting forward and return flows through said forward and return tube means, respectively.

5. The apparatus of claim 4, wherein said intake and discharge pipe means are inclined 45° with respect to the longitudinal axis of said forward and return tube means.

6. The apparatus of claim 1, wherein said forward tube means and said return tube means are disposed laterally abutting one another with parallel longitudinal axes, said partition wall means extending longitudinally between said forward and return tube means, said first transducer mounted in a first extension housing formed intermediately along said forward tube means, and said second transducer mounted in a second extension housing formed intermediately along said return tube means.

7. The apparatus of claim 6, wherein said first and second extension housings are inclined 45° with respect to the longitudinal axes of said forward and return tube means, such that said first and second transducers face one another.

8. The apparatus of claim 1, wherein said forward tube means and said return tube means are disposed laterally spaced and longitudinally axially parallel with respect to one another, a coupling means positioned along said wave measuring path for interconnecting said forward and return tube means for sound conduction, said partition wall means positioned in said coupling means, said first transducer mounted in a first extension housing formed intermediately along said forward tube means, and said second transducer formed in a second extension housing formed intermediately along said return tube means, said first and second transducer facing one another through said coupling means.

9. The apparatus of claim 8, wherein said coupling means is a tubular body.

10. The apparatus of claim 8, wherein said first and second extension housings and said coupling means are inclined 45° with respect to the longitudinal axes of said forward and return tube means.

11. The apparatus of claim 1, wherein said partition wall means is formed of material having substantially the same acoustical impedance as said flowing fluid.

12. The apparatus of claim 1, wherein the cross-sections of said forward and return tube means are substantially equal, at least in the area of said wave measuring path.

13. A method of ultrasonically measuring the rate of fluid consumption at a user station comprising:
  providing a forward fluid flow line to said user station and a return fluid flow line from said user station,
  providing an ultrasonic wave measuring path running between said forward and return flow lines, including a common partition wall means, permeable to ultrasonics, for preventing flow communication between said forward and return flow lines,
  placing first and second ultrasonic transducers at opposed ends of said wave measuring path and facing one another,
  issuing a first ultrasonic wave from said first transducer through said forward flow line and said return flow line in succession to said second transducer,
  issuing a second ultrasonic wave from said second transducer through said return flow line and said forward flow line in succession to said first transducer, and
  determining the fluid consumption rate from the difference in transit times along said wave measuring path for said first and second ultrasonic waves.

* * * * *